United States Patent
O'Toole et al.

(10) Patent No.: US 10,636,321 B2
(45) Date of Patent: Apr. 28, 2020

(54) METHODS AND SYSTEMS FOR IMPROVING HAND HYGIENE

(71) Applicant: GOJO Industries, Inc., Akron, OH (US)

(72) Inventors: Martin J. O'Toole, Chagrin Falls, OH (US); David S. Mackay, Hudson, OH (US); Jeffrey W. Hall, Hudson, OH (US); Jason M. Slater, Barberton, OH (US); Tamara M. Cross, Uniontown, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 14/789,595

(22) Filed: Jul. 1, 2015

(65) Prior Publication Data

US 2016/0005328 A1    Jan. 7, 2016

Related U.S. Application Data

(60) Provisional application No. 62/020,203, filed on Jul. 2, 2014.

(51) Int. Cl.
*G09B 19/00* (2006.01)
*G08B 21/24* (2006.01)

(52) U.S. Cl.
CPC ........ *G09B 19/0076* (2013.01); *G08B 21/245* (2013.01)

(58) Field of Classification Search
CPC .. G09B 19/00; G09B 19/0076; G08B 21/245; G08B 21/24

(Continued)

(56) References Cited

U.S. PATENT DOCUMENTS 4,746,907 A    5/1988   Zehnder, Jr.
5,042,091 A    8/1991   Tonkens
(Continued)

FOREIGN PATENT DOCUMENTS

WO    9933008    7/1999

OTHER PUBLICATIONS

Ward, et al. "Automated and electronically assisted hand hygiene monitoring systems: A systematic review". American Journal of Infection Control vol. 42 (May 2014) pp. 472-478.*

(Continued)

*Primary Examiner* — Robert J Utama
(74) *Attorney, Agent, or Firm* — Calfee, Halter & Griswold LLP

(57) ABSTRACT

Exemplary embodiments of methodologies of improving hygiene metric, methodologies of training observers, and software products for improving hygiene metrics are disclosed herein. An exemplary methodology of improving hand-hygiene includes obtaining data indicative of the number of opportunities for one or more users to obtain a dose of hand cleaner for a plurality of dispensers through an electronic monitoring system. In addition, the exemplary methodology includes obtaining data indicative of dispense events by the plurality of dispensers through the electronic monitoring system. The methodology further includes determining a metric for the one or more users as a function of the data indicative of the number of opportunities and the data indicative of dispense events and providing instructions for an observer to obtain observation data related to the one or more users as a function of the metric.

18 Claims, 4 Drawing Sheets

(58) Field of Classification Search
USPC .......................................................... 434/262
See application file for complete search history.

(56) References Cited

U.S. PATENT DOCUMENTS

| | | |
|---|---|---|
| 5,884,808 A | 3/1999 | Muderlak et al. |
| 5,941,363 A | 8/1999 | Partyka et al. |
| 6,236,317 B1 | 5/2001 | Cohen et al. |
| 6,278,372 B1 | 8/2001 | Velasco, Jr. et al. |
| 6,344,794 B1 | 2/2002 | Ulrich et al. |
| 6,360,181 B1 | 3/2002 | Gemmell et al. |
| 6,392,546 B1 | 5/2002 | Smith |
| 6,404,837 B1 * | 6/2002 | Thompson ........... A47K 5/1208 377/13 |
| 6,462,656 B2 | 10/2002 | Ulrich et al. |
| 6,539,393 B1 | 3/2003 | Kabala |
| 6,542,568 B1 | 4/2003 | Howes, Jr. et al. |
| 6,622,088 B2 | 9/2003 | Hood |
| 6,727,818 B1 * | 4/2004 | Wildman ............ G06F 19/3418 340/573.1 |
| 6,825,763 B2 | 11/2004 | Ulrich et al. |
| 6,876,303 B2 | 4/2005 | Reeder et al. |
| 6,958,706 B2 | 10/2005 | Chaco et al. |
| 6,972,683 B2 | 12/2005 | Lestienne et al. |
| 7,015,816 B2 | 3/2006 | Wildman et al. |
| 7,042,337 B2 | 5/2006 | Borders et al. |
| 7,080,061 B2 | 7/2006 | Kabala |
| 7,154,397 B2 | 12/2006 | Zerhusen et al. |
| 7,242,306 B2 | 7/2007 | Wildman et al. |
| 7,242,307 B1 | 7/2007 | Leblond et al. |
| 7,248,933 B2 | 7/2007 | Wildman |
| 7,271,728 B2 | 9/2007 | Taylor et al. |
| 7,286,057 B2 * | 10/2007 | Bolling ................ G08B 21/245 340/309.7 |
| 7,408,470 B2 | 8/2008 | Wildman et al. |
| 7,423,533 B1 | 9/2008 | Leblond et al. |
| 7,443,302 B2 | 10/2008 | Reeder et al. |
| 7,443,303 B2 | 10/2008 | Spear et al. |
| 7,450,024 B2 | 11/2008 | Wildman et al. |
| 7,679,520 B2 | 3/2010 | Zerhusen et al. |
| 7,734,476 B2 | 6/2010 | Wildman et al. |
| 7,812,730 B2 | 10/2010 | Wildman et al. |
| 7,855,651 B2 | 12/2010 | Leblond et al. |
| 7,907,053 B2 | 3/2011 | Wildman et al. |
| 7,911,249 B2 | 3/2011 | Wada |
| 8,026,821 B2 | 9/2011 | Reeder et al. |
| 8,094,029 B2 | 1/2012 | Ortiz et al. |
| 8,258,965 B2 | 9/2012 | Reeder et al. |
| 8,334,779 B2 | 12/2012 | Zerhusen et al. |
| 8,368,544 B2 | 2/2013 | Wildman et al. |
| 8,368,545 B2 | 2/2013 | Zerhusen et al. |
| 8,395,515 B2 | 3/2013 | Tokhtuev et al. |
| 8,427,323 B2 | 4/2013 | Alper et al. |
| 8,460,223 B2 | 6/2013 | Huster et al. |
| 8,487,774 B2 | 7/2013 | Reeder et al. |
| 8,502,680 B2 | 8/2013 | Tokhtuev et al. |
| 8,502,681 B2 * | 8/2013 | Bolling ................ G16H 40/20 340/573.1 |
| 8,558,660 B2 | 10/2013 | Nix et al. |
| 8,564,431 B2 | 10/2013 | Snodgrass |
| 8,572,778 B2 | 11/2013 | Newkirk et al. |
| 8,598,996 B2 | 12/2013 | Wildman et al. |
| 8,674,839 B2 | 3/2014 | Zerhusen et al. |
| 8,674,840 B2 | 3/2014 | Snodgrass |
| 8,698,637 B2 | 4/2014 | Raichman |
| 8,766,804 B2 | 7/2014 | Reeder et al. |
| 8,779,924 B2 | 7/2014 | Pesot et al. |
| 8,872,665 B2 | 10/2014 | Snodgrass |
| 8,917,166 B2 | 12/2014 | Collins, Jr. et al. |
| 9,672,726 B2 * | 6/2017 | Borke .................... G16H 40/20 |
| 2003/0163434 A1 | 8/2003 | Barends |
| 2003/1760207 | 9/2003 | Yamagishi |
| 2004/0090333 A1 | 5/2004 | Wildman |
| 2005/0043011 A1 | 2/2005 | Murray et al. |
| 2005/0151641 A1 | 7/2005 | Ulrich et al. |
| 2005/0248461 A1 * | 11/2005 | Lane .................... G08B 21/245 340/573.1 |
| 2008/0149515 A1 | 6/2008 | Godwin |
| 2008/0185399 A1 | 8/2008 | Yang et al. |
| 2009/0091458 A1 * | 4/2009 | Deutsch ................ G06Q 50/22 340/573.1 |
| 2009/0188033 A1 | 7/2009 | Honsa |
| 2009/0324444 A1 | 12/2009 | Stratmann |
| 2010/0262430 A1 | 10/2010 | Gips |
| 2010/0315244 A1 * | 12/2010 | Tokhtuev ............. G08B 21/245 340/603 |
| 2011/0316701 A1 | 12/2011 | Alpher |
| 2012/0154582 A1 | 6/2012 | Johnson et al. |
| 2012/0158419 A1 | 6/2012 | Nuthi |
| 2012/0329438 A1 | 12/2012 | Snodgrass |
| 2013/0113619 A1 | 5/2013 | Snodgrass |
| 2013/0127615 A1 | 5/2013 | Snodgrass |
| 2014/0009292 A1 | 1/2014 | Long et al. |
| 2014/0035744 A1 | 2/2014 | Wildman |
| 2014/0049391 A1 | 2/2014 | Bolling et al. |
| 2014/0070950 A1 | 3/2014 | Snodgrass |
| 2014/0081653 A1 | 3/2014 | Davis et al. |
| 2014/0292518 A1 | 10/2014 | Wildman |
| 2014/0297327 A1 | 10/2014 | Heil et al. |
| 2014/0320290 A1 | 10/2014 | Reeder et al. |

OTHER PUBLICATIONS

Gould et al. "Measuring handwashing performance in health service audits and research studies" Journal of Hospital Infection (2007) pp. 109-115 (Year: 2007).*

US 8,773,268, 7/2006, Hill Rom Services Inc. (withdrawn).

Joint Commission, Measuring Hand Hygiene Adherence; Overcoming the Challenges, 2009.

WHO Guidelines on Hand Hygiene in Health Care, 2009.

Office Action dated Jun. 2, 2017 for U.S. Appl. No. 14/938,269 dated Jun. 2, 2017.

* cited by examiner

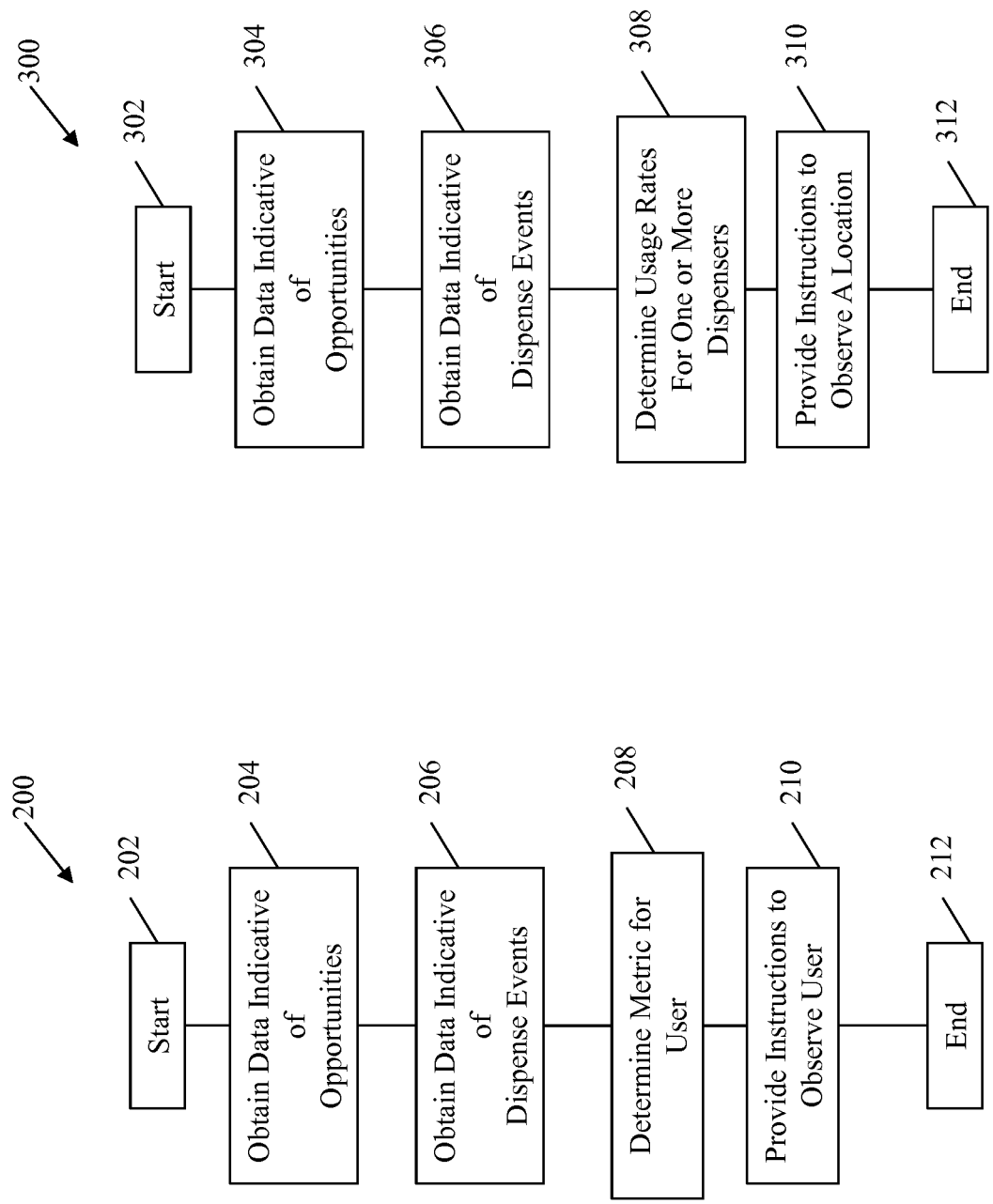

METHODS AND SYSTEMS FOR IMPROVING HAND HYGIENE

RELATED APPLICATIONS

This application claims priority to and the benefits of U.S. Provisional Patent Application Ser. No. 62/020,203 filed on Jul. 2, 2014 and entitled "METHODS AND SYSTEMS FOR IMPROVING HAND HYGIENE," which is incorporated herein by reference in its entirety.

BACKGROUND OF THE INVENTION

Traditionally, hand hygiene compliance metrics have been obtained through manual audits and observations. Manual audits and observations suffer from a number of deficiencies. Observers cannot monitor all hand hygiene stations and all personnel all the time. Observed compliancy metrics tend to increase when people know that an observer is watching them and tend to decrease when the observer is not present. In addition, observers randomly choose locations to observe. Accordingly, while compliance metrics in observed areas may increase during manual audits and observations they may only increase at selected sites and for limited times.

Recently, a number of companies have been offering technology-based tools that automatically obtain hand hygiene compliance metrics. These automated electronic hand hygiene compliance monitoring systems receive a signal from the dispenser when the dispenser dispenses a dose of hand cleaner ("a dispense event"). These systems sometimes receive a signal identifying the user that triggers the dispense event. In some cases, another sensor identifies opportunities for a user to wash her hands and the number of opportunities are compared to the number of dispense events to arrive at a compliance metric.

SUMMARY

Exemplary embodiments of methodologies of improving hygiene metric, methodologies of training observers, and software products for improving hygiene metrics are disclosed herein. An exemplary methodology of improving hand-hygiene includes obtaining data indicative of the number of opportunities for one or more users to obtain a dose of hand cleaner for a plurality of dispensers through an electronic monitoring system. In addition, the exemplary methodology includes obtaining data indicative of dispense events by the plurality of dispensers through the electronic monitoring system. The methodology further includes determining a metric for the one or more users as a function of the data indicative of the number of opportunities and the data indicative of dispense events and providing instructions for an observer to obtain observation data related to the one or more users as a function of the metric.

Another exemplary methodology for improving hand-hygiene includes obtaining data indicative of the number of opportunities for one or more users to obtain a dose of hand cleaner from one or more dispensers through an automated electronic monitoring system and obtaining data indicative of dispenses by the one or more dispensers through the automated electronic monitoring system. A metric for one or more dispensers is determined and instructions for an observer to obtain observation data for the one or more dispensers based on the metrics being below a selected threshold are provided.

An exemplary software product on a computer readable medium includes logic for receiving data indicative of a dispense events from a plurality of dispensers. The software product further includes logic for receiving data indicative dispense opportunities for each of the plurality of dispensers. Logic for comparing the dispense events with the dispense opportunities and logic for identifying one or more locations of the plurality of dispensers and providing instructions to observe the one or more of the locations that were identified are also included.

Another exemplary methodology of training metric observers includes obtaining automated data indicative of opportunities and dispense events for one or more dispensers through an electronic monitoring system. The methodology further includes obtaining observation data from a plurality of observers indicative of opportunities and dispense events for one or more dispensers and comparing the observation data to the automated data. Additional training is provided to one or more observers if the observation data deviates from the automated data by more than a selected value.

Still yet another exemplary methodology of quantifying and qualifying hand hygiene includes obtaining automated data indicative of opportunities and dispense events for one or more dispensers through an electronic monitoring system. The methodology further includes obtaining observation data indicative of opportunity and dispense events for the one or more dispensers and determining a metric as a function of both the automated data and the observation data.

BRIEF DESCRIPTION OF THE DRAWINGS

These and other features and advantages of the present invention will become better understood with regard to the following description and accompanying drawings in which:

FIG. 2 is a block diagram of an exemplary embodiment of a methodology for deploying observers for observing metrics;

FIG. 3 is a block diagram of an exemplary embodiment of a methodology for deploying observers for observing metrics;

DETAILED DESCRIPTION

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning Although the exemplary embodiments shown and described herein relate to hospital environments, the inventions disclosed herein are equally applicable to other industries, such as, for example, nursing homes, food preparation and processing industries, restaurants, electronics manufacturing and the like. Accordingly, the inventions claimed herein are not limited by the exemplary embodiments, but rather encompass any industry or facility that desires to increase hand hygiene performance.

Figure 1:
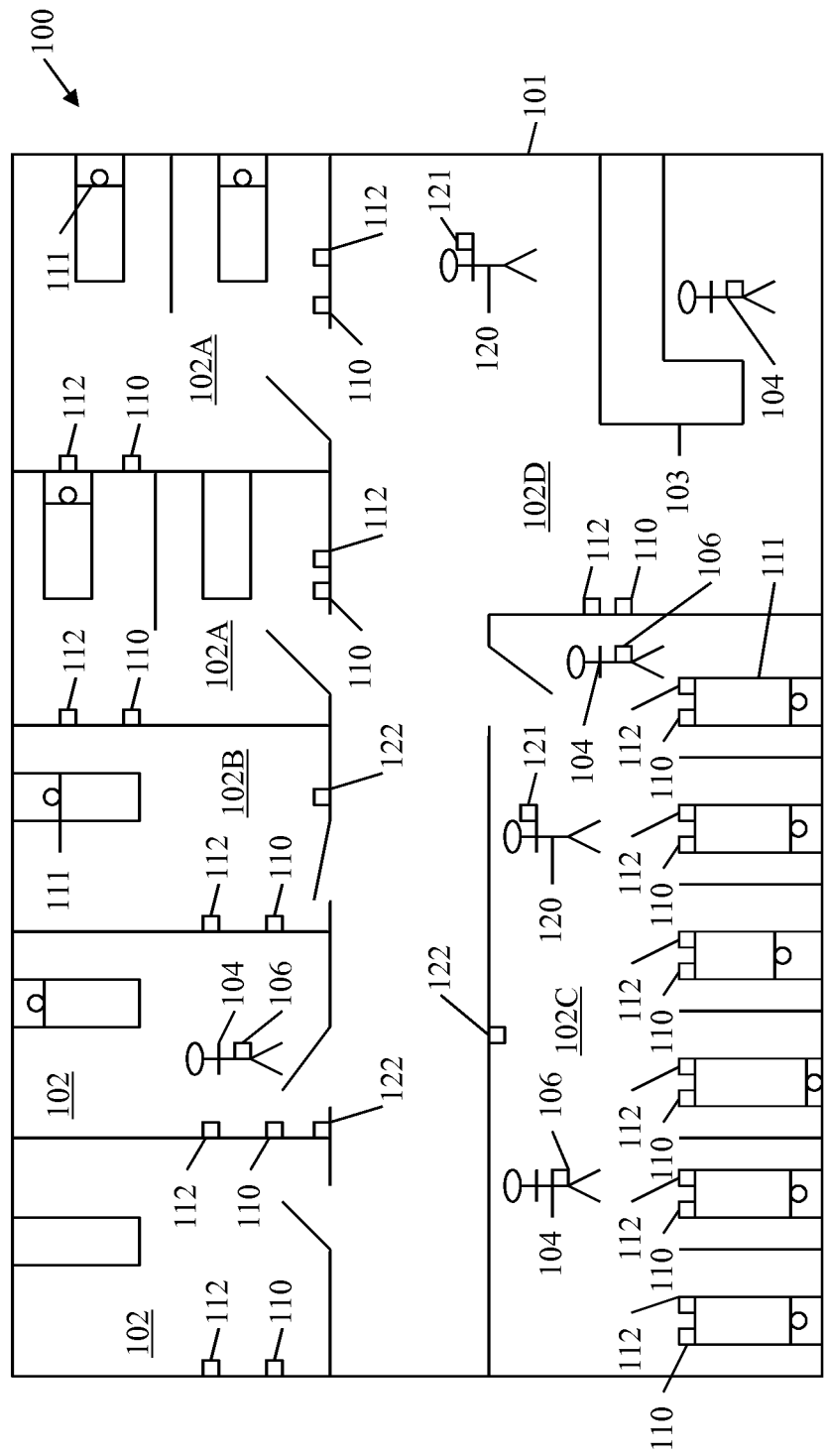
FIG. 1 is a schematic diagram of an exemplary embodiment of a monitoring system.

FIG. 1 is a schematic diagram of an exemplary embodiment of a monitoring system 100. Monitoring system 100 includes both an automated electronic monitoring system portion and observation monitoring portion. FIG. 1 illustrates a floor 101 of a hospital. The hospital floor 101 includes a plurality of rooms 102. Several of the rooms are double occupancy rooms 102A. Some of the rooms are single occupancy rooms 102B. One room is a critical care ward 102C and one area is the nurse station 102D. The automated electronic monitoring system 100 portion includes opportunity sensors 110. Opportunity sensors 110 may be any type of sensor such as a motion sensor, an infrared sensor, a photo-emitter/receiver combination or the like. Opportunity sensor 110 may detect entry and exit of the patient caregiver 104 into a patient area. In some embodiments, opportunity sensor may include an optical system, such as, for example, a camera and the opportunities may be obtained through use of analytical software that analyses the captured images to electronically identify opportunities. Similarly, the optical system may be used to electronically identify dispense events.

Opportunity sensor 110 includes circuitry to send an opportunity signal via a transmitter (not shown) to a computer (not shown). The opportunity signal may be sent directly to the computer. In some embodiments, it may be sent to a dispenser 112 which sends it to the computer. Optionally the opportunity signal may be sent by another transmitter or communication device. Dispenser 112 includes dispense event circuitry that sends a dispense signal back to the computer that indicates a dispense event has occurred and also may identify the dispenser with a unique ID.

When a user or caregiver 104 enters into room 102, opportunity sensor 110 determines that an opportunity for caregiver 104 to receive a dose of hand cleaner has occurred. The term "hand cleaner," as used herein may be any type of hand cleaner, such as, for example, soap, antibacterial soap, sanitizer, and the like. If dispenser 112 sends a signal to indicate that a dispense event has occurred, an algorithm in the computer may determine that the caregiver 104 is compliant, or within a set threshold of a desired hand cleaning status. In some embodiments, caregiver 104 carries a badge 106. Badge 106 may include a wireless transmitter (not shown) that transmits a unique ID so that computer may determine if the caregiver 104 assigned to badge 106 is compliant with a hand hygiene procedure. The term badge as used herein is not limited to standard badges, but rather includes any device that is configured to provide a user's identification, such as, for example, a bracelet, a card, a necklace, Google glasses, a tag, a bar code, and the like. In this exemplary embodiment, an opportunity sensor 110 and dispenser 112 are located proximate the nurse station 103, and proximate each patient bed 111. Accordingly, an opportunity exists every time caregiver 104 approaches a patient bed 111, enters or leaves a room or enters and leaves the nurse station 102D.

In some embodiments, a biometrics sensor (not shown) is included to determine the identity of a caregiver 104. The biometrics sensor (not shown) may include, for example, optics for facial recognition, vein recognition, retina recognition, finger print recognition or circuitry for any other type of biometric data.

The second portion of monitoring system 100 includes one or more portable devices 121 that have inputs that allow observers 120 that observe data to enter the observation data into the system. When the computer determines that a caregiver 104 has a metric that is outside a threshold, such as, for example, the caregiver 104 has set off multiple opportunity sensors 110 without causing a corresponding number of dispenser 112 to dispense hand cleaner, an observer 120 is instructed to go to the area where caregiver 104 is located and observed caregiver 104. The metric may be above or below the threshold. Observer 120 may monitor caregiver 104 to determine if there is a reason caregiver 104 is not obtaining a dose of hand cleaner from one or more dispenser 112 after triggering corresponding opportunity sensors 110. In some embodiments, an observer 120 may be instructed to observe one or more locations or one or more users as a function of dispenser data, such as, for example, the number of dispenses.

There may be any number of reasons why caregiver 104 is not obtaining a dose of hand cleaner when an opportunity sensor 110 is triggered. For example, if caregiver 104 is carrying objects or equipment she may not be able to obtain a dose of hand cleaner. Another example may be that the caregiver 104 is not approaching the patient bed 111 after triggering opportunity sensor 110. In these instances, observer 120 may adjust the metric that was determined by the collection of data obtained through the automated monitoring system.

In other instances, observer 120 may determine caregiver 104 did not have a valid reason for failing to obtain a dose of hand cleaner from dispenser 112. The observer 120 may enter the observation data into a portable electronic device 121. In some embodiments, the observer 120 may approach caregiver 104 and provide caregiver 104 with instructions on proper hand hygiene procedures. In addition, some embodiments, the observer 120 may be able to provide a signal to caregiver 104 that gently reminds or encourages caregiver 104 to wash their hands.

In some embodiments, monitoring system 100 monitors dispensers 112, to determine if one or more of dispensers 112 are associated with metrics that are outside of threshold. If one or more dispensers 112 are associated with metrics are outside of a threshold, or have low or high dispense events, an observer 120 is instructed to go and observe the locations of the one or more dispensers 112. The observer 120 may be able to determine the reason the dispenser is associated with a metric that is outside a threshold, such as, for example, the dispenser is not operating properly, the dispenser is in a poor location, the opportunity sensor 110 is malfunctioning, or the like. The observer 120 may upload such causal data to the system.

The portable electronic device 121 may be, for example, a wireless computing device that may receive a signal from the central computer in real time; for example, when an opportunity sensor 110 is triggered, when a dispenser 112 dispenses a dose hand cleaner, the identification of the caregiver 104 that obtained a dose of hand cleaner, or the identification of the caregiver 104 that set off the opportunity sensor 110, and the like. The observer 120 may upload the observation data and/or causal data from the portable electronic device 121 to the system. As noted above, the data may be causal data. In addition, the data may be visual data, such as, for example, a video image of a person's behavior.

In some embodiments, an optical system, such as, for example, a camera 122 is used in one or more rooms 102 to monitor opportunity sensor 110, dispenser 112 and caregiver 104. The camera 122 may be permanently mounted in an area positioned so that only the dispenser 112 and/or opportunity sensor 110 is visible to ensure patient privacy. Thus, a single observer 120 may monitor several cameras 122 at the same time. In some embodiments, the observer 120 may receive a signal when an opportunity sensor 110 is triggered.

This may allow the observer 120 to turn her attention to the correct monitor. The observer 120 may also be notified when a dispense event is recorded from a dispenser 112. The term "camera" as used herein may be any type of camera, such as, for example, a video camera, a still image camera, a surveillance camera and the like.

In addition, in some embodiments an image of the caregiver 104 is provided to observer 120 so that observer 120 can identify a specific caregiver 104 and monitor that caregiver 104 for selected period of time. In some embodiments, observer 120 may provide instructions to the specific caregiver 104 on proper hand hygiene methods.

A number of flow diagrams for exemplary methodologies for improving hand hygiene metrics are disclosed herein. Although the blocks and methodologies below are shown and described in a certain order, the exemplary steps may be completed in different orders, different combinations, with additional steps and/or without certain steps, all of which are included in the scope of the present invention.

FIG. 2 is a block diagram of exemplary methodology for improving hand hygiene 200. The methodology begins at block 202 and at block 204 data is obtained that is indicative of the number of opportunities for one or more users to obtain a dose of hand cleaner from a plurality dispensers through an electronic monitoring system. At block 206, data is obtained that is indicative of dispense events by a plurality of dispensers through the electronic monitoring system. At block 208, a metric is determined for the one or more users. The metric may be a function of the data indicative of the number of opportunities and the data indicative of a number of dispense events. If the metric is outside of a threshold, at block 210, instructions are provided to an observer to observe the user, or group of users, that have a metric that is outside of a threshold. The methodology ends at block 212. An exemplary metric is the number of dispense events divided by the number of opportunities for particular user or group users. The instructions to observe the observer may be instructions to view a monitor or to observe a pre-recorded video, or stored historical images.

The threshold may be a dynamic threshold, such as for example, a historical trend may be obtained and the threshold may be triggered if the historical trend is trending downward. Another exemplary dynamic threshold may be a threshold that is determined based upon the metrics generated by the group of users. Such as, for example, if the average is a metric of 80% for the group of users, the dynamic threshold may be set at 80% which is the average for that group. In addition the threshold may be a static threshold that has preselected, or is selected after some automated data is obtained.

This exemplary methodology may be used to allow the observer 120 to provide instructions to caregiver 104 on hand hygiene procedures. In some embodiments, the observer 120 provides a signal to caregiver 104 to gently urge or remind caregiver 104 to comply with hand hygiene policies.

In some embodiments, the data obtained from the automated electronic monitoring system and the observation data provided by the observer are overlaid on the screen or display. The overlaid data provides an operator with a visual display which allows the operator to immediately detect an issue with the hand hygiene with selected users of caregivers, selected locations, and/or with selected dispensers. The observation data may be used to enhance the automated electronic data and in some embodiments the automated electronic data is used to enhance the observation data.

FIG. 3 is a block diagram of exemplary methodology for improving hand hygiene 300. The methodology begins at block 302. At block 304 data is obtained indicative of the number of opportunities for one or more users to obtain a dose of hand cleaner for a plurality of dispensers through the electronic monitoring system. At block 306 data is obtained that is indicative of dispense events by a plurality dispensers through the electronic monitoring system. At block 308, a usage rate is determined for the one or more dispensers. The usage rate may be a function of the data that is indicative of the number of opportunities and the data that is indicative of a number of dispense events is determined at block 310. The usage rate may be data indicative of the dispense events. If the usage rate is outside of threshold, instructions are provided to an observer to the monitor and/or inspect the location that includes the one or more dispensers that are outside of the threshold. The methodology ends at block 312.

The threshold may be a dynamic threshold, such as for example, a historical trend for a dispenser that is trending downward. Another exemplary dynamic threshold, may be a threshold that is determined based upon the usage rates by a plurality of dispensers in a group of dispensers in a selected area. Such as, for example, if the usage rate based on the number of dispenses per number of opportunities of an average of a number of dispensers is at 80% the dynamic threshold may be set at 80%. In addition the threshold may be a static threshold that has preselected, or selected after the some automated data is obtained.

The exemplary methodology allows the observer 120 to determine why a dispenser or group dispensers have a low or high usage rate. Dispensers may have a low or high usage rate because, for example, the location of the dispenser is in an undesirable area, the dispenser is broken, or is located too close to another dispenser.

In some embodiments, the data obtained from the automated electronic monitoring system and the observation data provided by the observer may be overlaid on the screen or display, to provide an operator with the visual display allowing an operator to quickly spot issues with hand hygiene occurrences or procedures. The observation data may be used to enhance the automated electronic data and in some embodiments the automated electronic data is used to enhance the observation data.

The exemplary methodology allows the observer 120 to determine why a dispenser or group dispensers have a high or low usage rate. Dispensers may have a low usage rate because, for example, the location of the dispenser is in an undesirable area, that the dispenser is broken, or is located too close to another dispenser.

Figure 4:
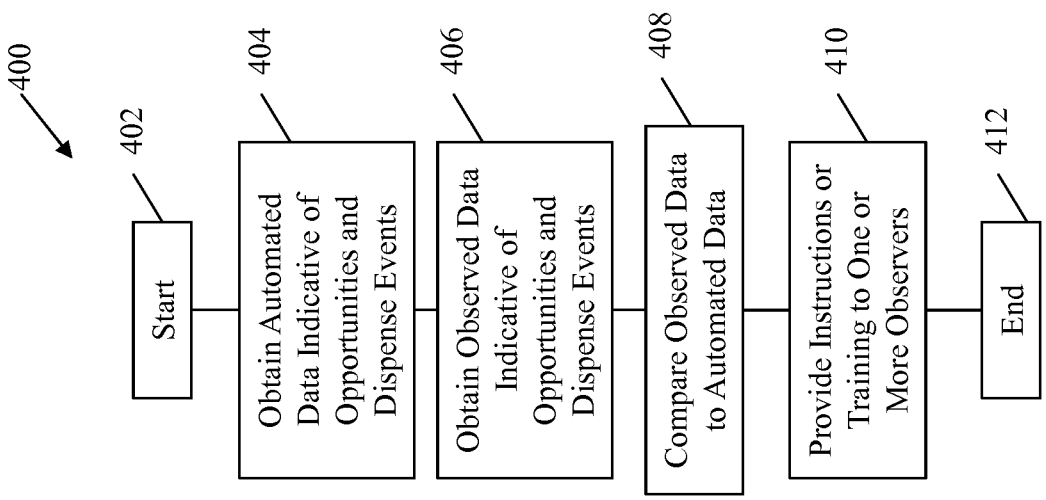
FIG. 4 is a block diagram of an exemplary embodiment of a methodology for training observers.

FIG. 4 is a block diagram of exemplary methodology for improving the performance of observers 400. The methodology begins at block 402 and at block 404 data is obtained that is indicative of the number of opportunities for one or more users to obtain a dose of hand cleaner for a plurality of dispensers through electronic monitoring system. Data is obtained that is indicative of dispense events by the plurality of dispensers through the electronic monitoring system. At block 406 observed data is obtained that is indicative of opportunities and dispense events. At block 408 the observed data is compared to the automated data. At block 410 instructions are provided to the one or more observers for actions to be taken based on whether the observation data deviates from the automated data of more than a selected value or threshold. The instructions may be training instructions, observation instructions, recognitions and the like. The methodology ends at block 412.

The value may be a dynamic threshold, such as for example, a value that is a function of the observation data from a plurality of observers. In addition the automated data may be historical data for the dispenser or group of dispensers or data that is obtained simultaneously with the observation data.

Figure 5:
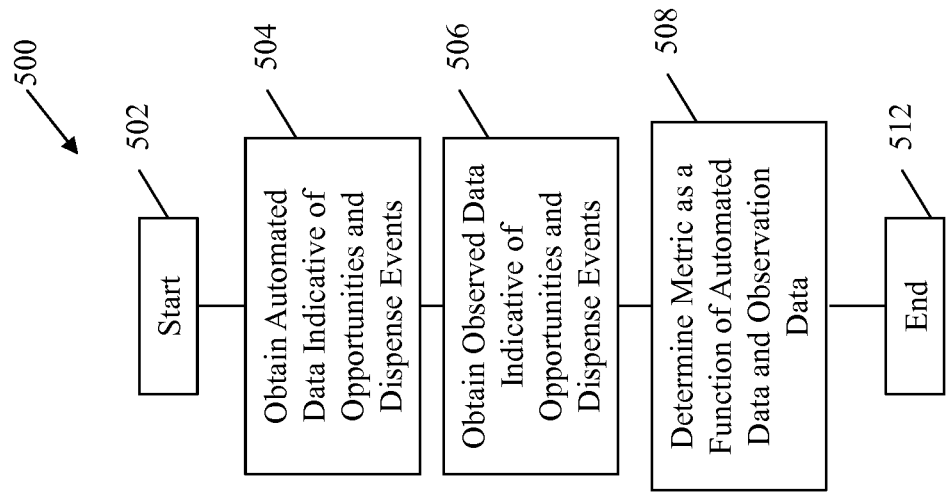
FIG. 5 is a block diagram of an exemplary embodiment of a methodology for determining a metric.

FIG. 5 is a block diagram of an exemplary methodology 500 for determining metrics. The methodology begins at block 502 and at block 504 data is obtained that is indicative of opportunities and dispense events for one or more dispensers through an electronic monitoring system. At block 506 observation data is obtained that is indicative of opportunities and dispense events for the one or more dispensers. At block 508 a metric is determined. The metric is a function of both the automated data and the observation data in the procedure ends at block 512. In some embodiments, the metric is a function of the dispense events and the observation data. In some embodiments, the metric is a function of the dispense events, the observation data, and other data, such as for example, an estimated observation rate. The estimated observation rate may be varying due to the location of the dispenser. For example, the estimated observation rate may be higher in a critical care ward, than at a nurse's station.

Figure 6:
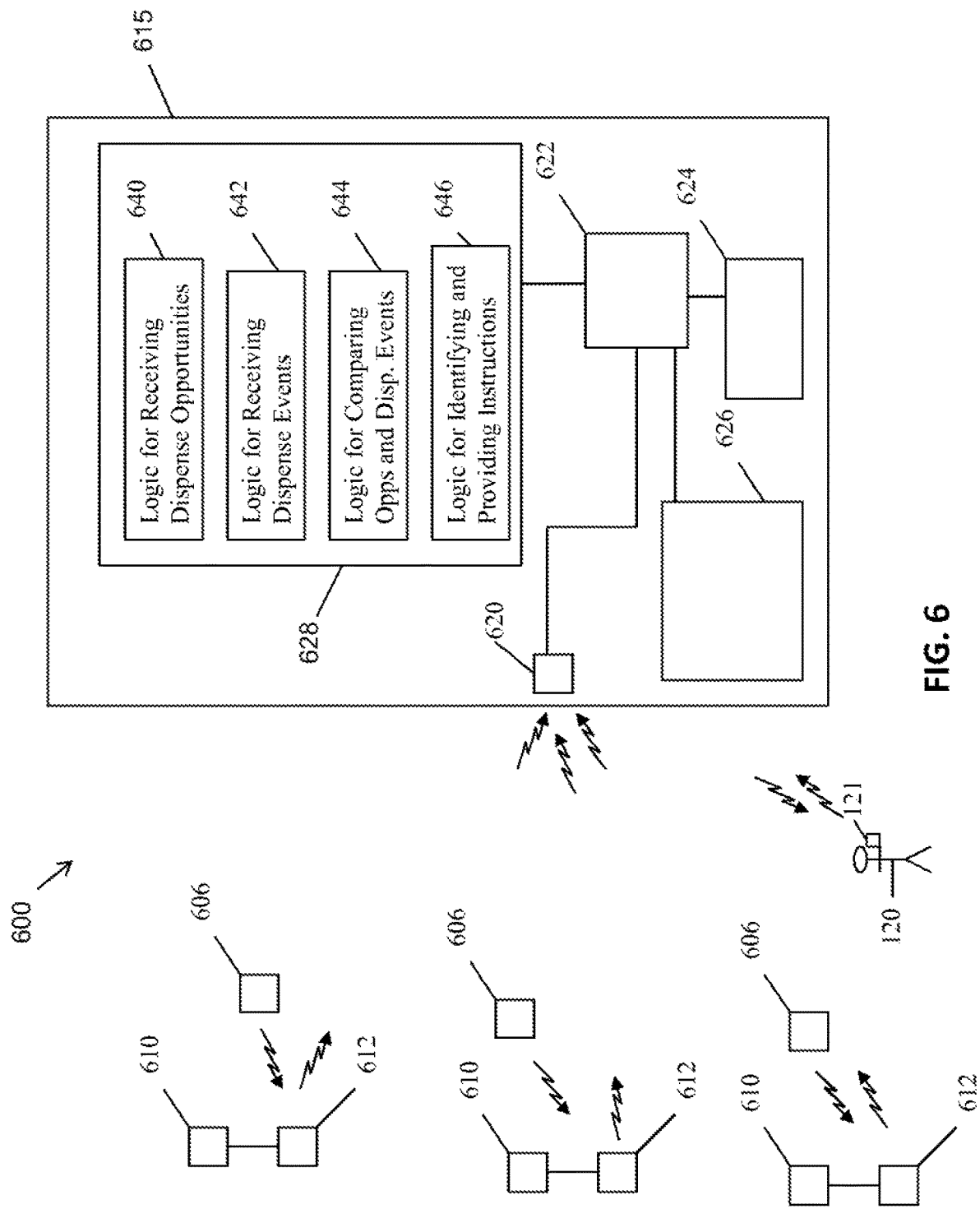
FIG. 6 is a schematic diagram of an exemplary embodiment of a system that includes a software product for a monitoring system.

FIG. 6 is a schematic diagram of an exemplary embodiment of a system 600 that includes a software product for a monitoring system. System 600 includes a plurality of opportunity sensors 610. Opportunity sensors 610 are in circuit communication with dispenser 612. In some embodiments, dispenser 612 includes a transmitter for transmitting a signal indicative of dispense events to monitoring station 615, and in some embodiments a signal indicative of the unique ID for a user is provided to the dispenser 612 by a badge 606. Badge 606 includes a transmitter that transmits a signal to dispenser 612 to provide a unique ID to dispenser 612. In some embodiments, badge 606 has a transmitter that transmits a signal to monitoring station 615. Monitoring station 615 includes a receiver 620 for receiving signals from a plurality of dispensers 612 and/or a plurality of badges 606. Monitoring station 615 includes a processor 622 that is in circuit communication with receiver 620, display 626, user input 624 and memory 628. In some embodiments, the system includes a portable electronic device 121 carried by an observer 120 for transmitting observation data to the system.

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Memory 628 may be any type of memory such as for example, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some embodiments, the memory 628 is separate from the processor 622, and in some embodiments, the memory 628 resides on or within processor 622.

Located in memory 628 is logic 640 for receiving data indicative of dispense opportunities from plurality dispensers. In addition, located in memory 626 is logic 642 for receiving data indicative of dispense events for each of the plurality dispensers. Logic 644 is included for comparing the dispense events and the dispense opportunities. In addition, memory 628 includes logic 646 for identifying one or more dispensers and providing instructions for an observer to observe the one or more dispensers that were identified. In some embodiments, the logic 646 for identifying one or more dispensers includes logic for determining whether dispense events falls below a threshold.

In some embodiments, memory 628 also includes logic for receiving data indicative of a specific user's dispense events per dispense opportunities and for providing instructions to observe the specific user. In some embodiments logic is included in memory 628 for receiving data indicative of a specific user's dispense opportunities and for providing instructions to observe the specific user. Similarly, in some embodiments, memory 628 includes logic for receiving data indicative of a group of users' dispense events per dispense opportunities and for providing instructions to observe the users. In some embodiments memory 628 includes logic for identifying a user and in some cases includes logic to direct an observer to observe the identified user. In some embodiments, the observer is instructed to obtain causal data for determining why a metric is below a threshold value. In addition, system 600 may include logic to carry out any of the methodologies identified with respect to the exemplary embodiments disclosed herein.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A method of improving hand-hygiene comprising:
    obtaining opportunity data indicative of the number of opportunities for one or more users to obtain a dose of hand cleaner from a plurality of dispensers through an electronic monitoring system;
    wherein the opportunity data is obtained via an opportunity sensor for determining the one or more users entered or exited an area and via one or more badges associated with the one or more users;
    obtaining dispense event data indicative of dispense events by the plurality of dispensers through the electronic monitoring system;
    wherein the electronic monitoring system comprises one or more opportunity sensors for determining the presence of the one or more users that are in the proximity of one or more dispensers and electronic circuitry associated with the plurality of dispensers for determining dispense events and transmitting dispense event data;
    transmitting the opportunity data from the opportunity sensors and dispense event data using wireless communication circuitry to a central computer;
    determining a first metric for the one or more users or one or more dispensers as a function of the opportunity data indicative of the number of opportunities and the dispense event data indicative of dispense events;
    determining a need for observation data to be collected if the first metric is outside of a threshold or is trending in a negative direction;
    providing instructions for an observer to obtain observation data that is in addition to the data obtained through the electronic monitoring system and is related to the one or more users or the one or more dispensers as a function of the first metric and a threshold or a trend;
    wherein the observation data is data obtained by the observer physically observing the one or more users or the one or more dispensers; and
    submitting the observation data to the central computer.

2. The method of claim 1 wherein providing instructions to an observer to obtain observation data is a function of a trend in the first metric.

3. The method of claim 2 wherein the trend is an upward trend.

4. The method of claim 1 further comprising adjusting the first metric for the one or more users based on the observation data.

5. The method of claim 1 further comprising adjusting the first metric for the one or more users or the one or more users based on the observation data.

6. The method of claim 1 further comprising displaying the compliance metric related to the one or more users or the one or more dispensers and the observation data for comparison.

7. The method of claim 1 further comprising providing the observer with data indicative of dispense events in real time.

8. A hand-hygiene monitoring system comprising:
    a dispenser having circuitry for outputting a dispense event signal;
    an opportunity sensor having a circuitry for outputting an opportunity signal;
    one or more badges associated with one or more users;
    a monitoring station, the monitoring station obtaining the dispense event signal from the dispenser and the opportunity signal from the opportunity sensor;
    logic stored in memory in the monitoring station for determining a first metric as a function of the dispense event signal and the opportunity signal and for comparing the metric to a threshold or a trend;
    logic for providing instructions to observe one of a dispenser location and the one or more users as a function of the metric is trending in a negative direction;
    a portable device having circuitry configured to receive observation data input from an observer physically observing the dispenser location or the one or more users and circuitry for outputting an observation signal as a function of the observation data;
    the monitoring station further having a receiver for receiving the dispense event signal, the opportunity signal and the
    observation signal; and
    the monitoring station further having a display for displaying information that is a function of the dispense event signal, the opportunity signal and the observation signal.

9. The hand-hygiene monitoring system of claim 8 further comprising logic for calculating a metric that includes data from a plurality of dispense event signals, a plurality of opportunity signals and one or more observation signals.

10. The hand-hygiene monitoring system of claim 8 wherein a second metric is generated as a function of the observation signal.

11. The hand-hygiene monitoring system of claim 8 further comprising a user identification device.

12. A method of improving hand-hygiene comprising:
    obtaining opportunity data from an opportunity sensor that one or more users are in proximity of a dispenser;
    identifying the one or more users via a badge:
    obtaining dispense event data relating to use of the dispenser by the one or more users wherein the dispenser includes circuitry for outputting a the dispense event data;
    transmitting the opportunity data to a central computer;
    transmitting the dispense event data to a central computer;
    determining whether the dispense event data relating to the use of the dispenser by the one or more users is outside of a threshold or is trending in a negative direction; and if the dispense event data is outside of a threshold or is trending in a negative direction, providing instructions for an observer to obtain observation data that is a function of the observer observing the one or more users.

13. The method of claim 12 wherein providing instructions to an observer to obtain observation data is a function of a trend in a metric derived from the opportunity data and dispense event data.

14. The method of claim 13 wherein providing instructions to an observer to obtain observation data is a function of a metric being outside of a threshold.

15. The method of claim 13 further comprising providing instructions to the one or more users based on both the determined metric and the observation data.

16. The method of claim 12 further comprising providing a signal initiated by the observer to encourage one or more users to change a behavior.

17. The method of claim 12 further comprising comparing the electronically obtained data to the observation data and determining one or more reasons the data from the electronically obtained data is different than observation data.

18. The method of claim 12 further comprising displaying a metric based on the electronically obtained data and the observation data for comparison.

\* \* \* \* \*